Z. OLSSON.
APPARATUS FOR INDICATING THE CONDITION OF COAL COMBUSTION.
APPLICATION FILED AUG. 26, 1920.

1,383,144.

Patented June 28, 1921.
2 SHEETS—SHEET 1.

WITNESSES

INVENTOR
Zacharias Olsson
BY
ATTORNEYS

Z. OLSSON.
APPARATUS FOR INDICATING THE CONDITION OF COAL COMBUSTION.
APPLICATION FILED AUG. 26, 1920.
1,383,144.
Patented June 28, 1921.
2 SHEETS—SHEET 2.
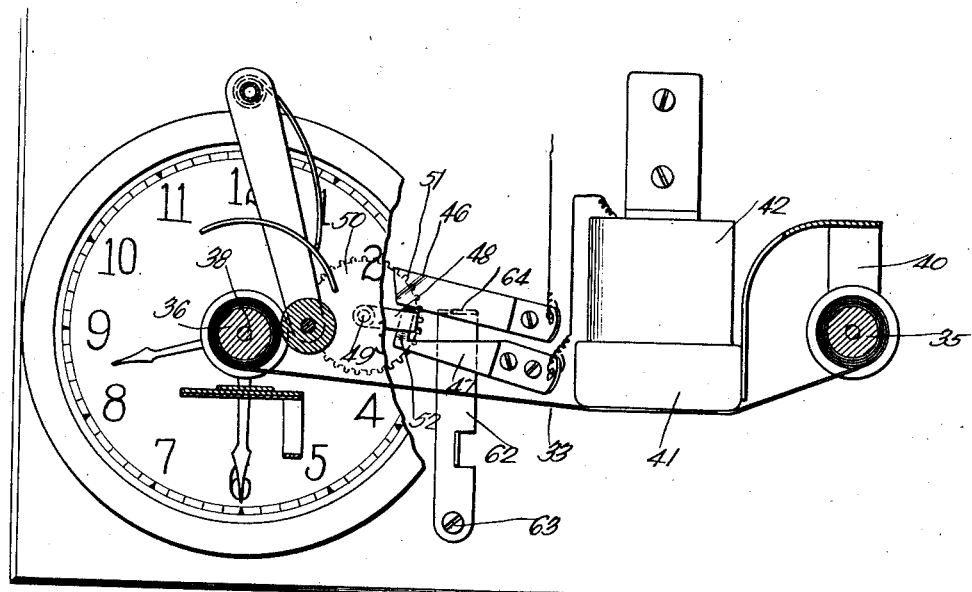
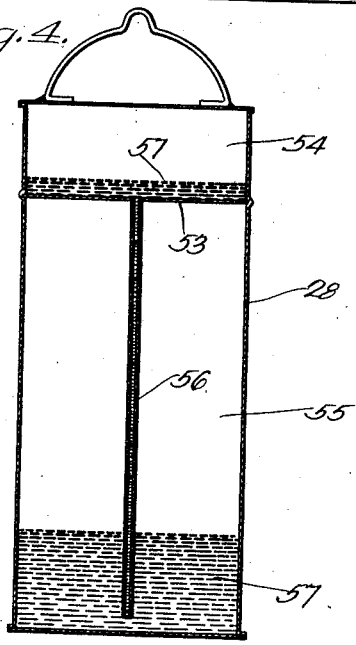
WITNESSES
INVENTOR
Zacharias Olsson
BY
ATTORNEYS

UNITED STATES PATENT OFFICE.

ZACHARIAS OLSSON, OF BROOKLYN, NEW YORK, ASSIGNOR TO AUG. RUST-OPPENHEIM, OF NEW YORK, N. Y.

APPARATUS FOR INDICATING THE CONDITION OF COAL COMBUSTION.

1,383,144.  Specification of Letters Patent.  Patented June 28, 1921.

Application filed August 26, 1920. Serial No. 406,522.

*To all whom it may concern:*

Be it known that I, ZACHARIAS OLSSON, a subject of the King of Sweden, and a resident of the city of New York, borough of Brooklyn, in the county of Kings and State of New York, have invented a new and Improved Apparatus for Indicating the Condition of Coal Combustion, of which the following is a full, clear, and exact description.

Among the principal objects which the present invention has in view are: to produce a continuous record of the condition of coal consumption; to avoid inaccuracies in the production of the record mentioned; to obviate inaccuracies in the measurement of gases having variable temperatures; and to cool and filter the gases before the same are delivered for measurement.

Drawings.

Fig. 3 is a detail view showing in plan the supporting mechanism for a record ribbon with which the apparatus is furnished;

Fig. 4 is a vertical section taken on the median plane of a balance for the scales employed in the present invention;

Fig. 5 is a detail view showing a method of completing the electric circuit for actuating the record-producing mechanism.

Figure 1:
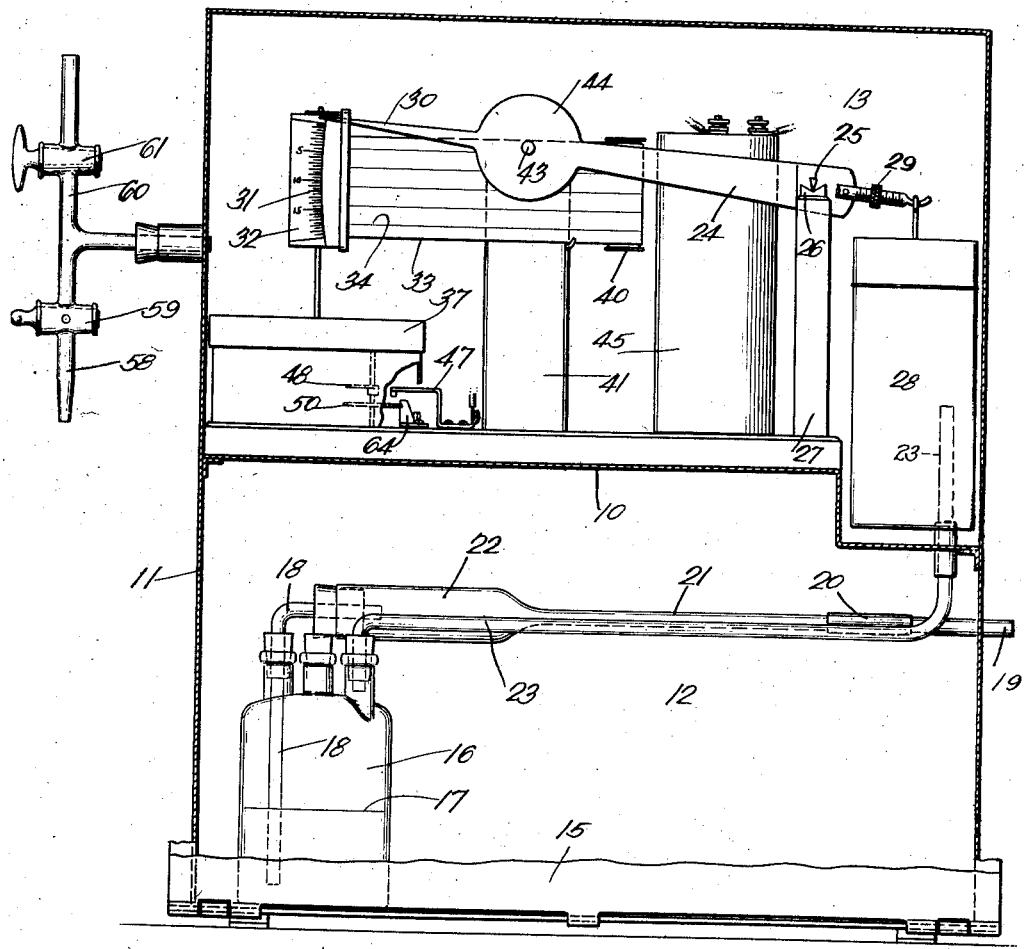
Figure 1 is a side elevation of an apparatus for measuring the variations in the specific gravity of gases, the same being constructed and arranged in accordance with the present invention.

Description.

The apparatus at present is chiefly employed to ascertain the carbon dioxid content present in flue gases. As is well known, the quantity of carbon dioxid in said gases is commensurate with the condition of consumption of the coal forming the flue gases. This chemical constituent of the gases may be ascertained by the comparison by weight of atmospheric air therewith. The condition of the gases varies during the operation of a furnace, and in greater or less degree as the consumption of fuel continues. If the fireman is neglectful or unskilful, or the condition of the furnace is defective, such will be reflected or disclosed by a record which is maintained over a sufficient period of time. The superintendent if supplied with such a record could correct the evil.

As seen in the drawings, a partition 10 divides a cabinet 11 to form a lower chamber 12 and an upper chamber 13. The chamber 13 is sealed by a front glass cover 14, so that the surrounding air is prevented from entering the said chamber 13. The chamber 12 is normally closed by a door 15, which may be opened to remove at will a filter 16. Atmospheric air is admitted to the chamber 12, while flue gases only are delivered to the chamber 13. The filter 16 is employed for filtering and cooling the flue gases before delivering the same to the chamber 13, and to this end, the filter has a liquid, such as water 17, for cooling the gases as the same pass therethrough from the pipe 18, the delivery end whereof extends below the surface of said water.

The flue gases referred to are taken from the smoke flue of a furnace and are conveyed by a pipe 19 to the chamber 12. The pipe 19 is there connected by a flexible joint 20 to a pipe 21, the end whereof is enlarged to form the bulb 22. Within the bulb 22 is contained some filtering material such as cotton wool for removing any suspended foreign substances from the gases. The gases after passing through the water 17 are delivered from the filter 16, by a pipe 23, the delivery end whereof extends into the chamber 13.

Within the chamber 13 is a balancing steelyard 24, which is mounted on knife blades 25 in saddles 26 at the top of standards 27. The steelyard 24 is balanced by a float member 28 and an adjustable nut 29. Normally and while inactive, the member 28 and nut 29 are so adjusted that the end of the pointer 30 rests at zero. This adjustment is made when the chamber 13 contains atmospheric air. When the chamber is closed and the atmospheric air is displaced by the carbon dioxid or flue gases, the float member 28 is lifted thereby, so that the pointer 30 moves over the calibrations 31 on the scale plate 32. The calibrations 31 are set to indicate in degrees, the percentage of carbon dioxid ($CO_2$) in the gases.

The condition at the moment of the gases passing through the chamber 13 may be ascertained by the attendant observing the steelyard 24 and the pointer 30 thereof in its position on the scale plate 32. With this purpose in view, a ribbon 33 is provided, which ribbon has disposed lengthwise thereof the divisional lines 34, the spacing whereof corresponds with the calibrations on the plate 32. As seen best in Fig. 3 of the drawings, the ribbon 33 is initially wound on a spool 35, and is delivered therefrom and ultimately wound on a spool 36. The spool 36 is driven by clock mechanism contained in a clock-case 37. The spool 36 is provided with a spindle 38, which operatively engages the minute post of the clock mechanism. The supply ribbon is mounted on a spool 39. Brackets 40 are provided to support the spool 39, and are in turn supported on a standard 41. The standard 41 also supports an electromagnet 42, the core whereof extends through the standard 41 to rest against the under side of the back of the ribbon 33.

Figure 2:
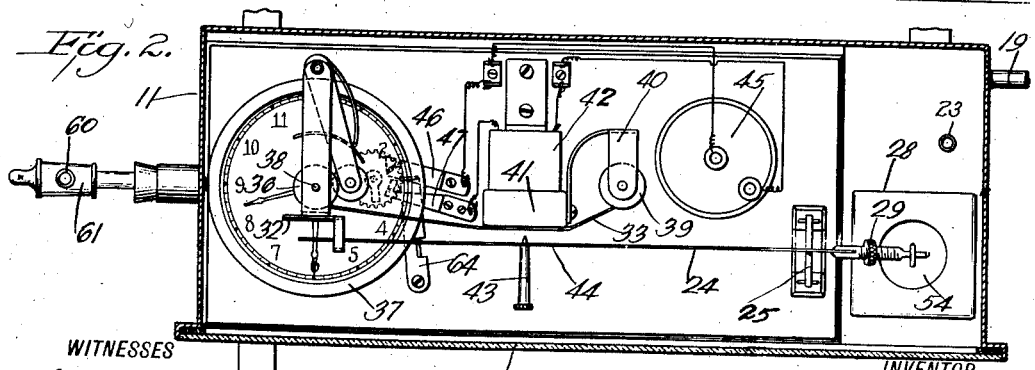
Fig. 2 is a plan view of the same.

The steelyard 24 supports a marking pencil or pen and a case 43 therefor. As seen best in Fig. 2 of the drawings, the point of the marking member extends slightly beyond the armature disk 44. The steelyard 24 and disk 44 are constructed of iron or magnetic attractive metal and the disk 44 is of sufficient width so that in all positions of the pointer 30, some portions of the disk will centralize with the core of the electromagnet 42.

The electromagnet 42 is energized by an electric current wherein is incorporated a battery 45, the electromagnet 42, and spring terminals 46 and 47. As seen best in Fig. 5 of the drawings, the circuit incorporating the terminals 46 and 47 is completed whenever the switch blade 48 extends across and contacts with both terminals. As seen in said figure, when the blade 48 passes the terminal 46, said terminal springs to a position which provides an air gap between the blade 48 and the terminal.

As seen best in Fig. 3 of the drawings, the blade 48 is mounted on a standard 49, which is rotated in unison with a wheel 50 driven by the gear train of the clock. The rate of rotation of the standard 49 and the wheel 50 connected therewith, is regulated by the ratio of the wheel 50 to the said gear train. To insure the passing of the blade 48 over the terminals 46 and 47, the said terminals have inclines 51 and 52.

It is obvious that as the gear train of the clock rotates the spool 36 to draw the ribbon 33 past the station occupied by the marking member having the case 43, the wheel 50 is rotated and at intervals moves the blade 48 into position where the electric circuit is completed through the electromagnet 42, which is energized until the blade 48 passes out of contact with the terminal 46. During this short period of activity of the electromagnet, the disk 44 and marking member carried thereby are drawn toward said electromagnet, the point of the marking member being brought sharply into contact with the surface of the ribbon 33 to imprint thereon a dot.

Before the pressure of the marking member on the ribbon 33 could operate to retard the travel of the said ribbon, the blade 48 passes out of contact with the terminal 46 and the electromagnet 42 becomes deënergized. The spring of the metal of which the steelyard 24 is constructed then operates to draw the marking member away from contact with the surface, leaving the said steelyard to respond to the flotation of the member 28.

As seen best in Fig. 4 of the drawings, the float member 28 is divided by a partition 53, to form an open chamber 54 and a closed chamber 55. The chambers 54 and 55 communicate by means of a pipe 56.

As stated, the steelyard is adjusted in balance by means of the nut 29 and at a place where the pointer 30 rests opposite the zero indication of the calibration 31. The metallic elements thereafter are constant, and the balance would remain unchanged but for the variation in weight between the flue gases which are admitted to the chamber 13 and the weight which is held in the chamber 55 of the float member. One of the conditions of the operation of the apparatus is the variation in atmospheric pressures.

The change in pressure necessarily affects the air in the chamber 55, tending to expand or compress the same.

To avoid contamination of the air by the gases, the air is trapped in the chamber 55 by means of a suitable liquid, such as oil 57. Said oil is poured into the member 28 and into the chamber 54 thereof until the pressure on the air in the chamber 55 supports the column of oil in the pipe 56. To insure the maintenance of the column of oil in the pipe 56, the pouring of the oil is continued until a thin layer of oil is deposited on the top of the partition 53. It is obvious that the pressure on the air in the chamber 56 is now exerted through the column of oil while the air is protected.

As shown in Fig. 1 of the drawings, a drainage pipe 58 is provided, having a valve 59. The pipe 58 is connected with an escape pipe 60, which has a valve 61. Under usual conditions the valve 61 is open so that the gases in the chamber 13 are held under atmospheric pressures.

When it is desired to make a chemical test or analysis of the gases, this is accomplished by closing the valve 61, and opening the valve 59. The gases are then drawn by means of the drainage pipe 58 to a suitable receptacle where they are tested.

A latch 62, pivoted at 63, has an upturned end 64, which is adapted for engaging the teeth of the wheel 50 when so moved. The latch 62 is employed for preventing the operation of the recording mechanism including the ribbon 33.

Claims.

1. An apparatus as characterized comprising a gravity balanced scales, a gas chamber, a counterbalancing member for said scales mounted in said chamber, said counterbalancing member containing heat-expansible fluid of different specific gravity than the gas normally admitted to said chamber, and means for sealing said fluid in said counterbalancing member, said means being displaced as the fluid expands.

2. An apparatus as characterized comprising a gravity balanced scales, a gas chamber, a counterbalancing member for said scales mounted in said chamber, said counterbalancing member containing a fluid of different specific gravity than the gas normally admitted to said chamber, and means for sealing said fluid in said counterbalancing member, said means embodying an oil seal.

3. An apparatus as characterized comprising a gravity balanced scales, a gas chamber, a counterbalancing member for said scales mounted in said chamber, said counterbalancing member containing a fluid of specific gravity differing from the gas normally admitted to said chamber, and means for sealing said fluid in said counterbalancing member, said means embodying a partition dividing said chamber to form a closed chamber and an open chamber, said chambers communicating by means of a pipe overflowing from the upper to the lower chamber.

4. An apparatus as characterized comprising a gravity balanced scales, a gas chamber, a counterbalancing member for said scales mounted in said chamber, said counterbalancing member containing a fluid of specific gravity differing from the gas normally admitted to said chamber, and means for sealing said fluid in said counterbalancing member, said means embodying an oil seal and a displacement relieving column therefor.

5. An apparatus as characterized comprising a gravity balanced scales, a gas chamber, a counterbalancing member for said scales mounted in said chamber, said counterbalancing member containing a fluid of specific gravity differing from the gas normally admitted to said chamber, and means for permitting the expansion of said fluid within said member.

6. An apparatus as characterized comprising a steelyard, weight means for normally overbalancing the same, an inclosed chamber for holding a fluid totally enveloping said weight means for supporting the same, a moving record member, a marking device attached to said steelyard to move therewith, and means for intermittently moving said marking device to engage said record member.

7. An apparatus as characterized comprising a steelyard, weight means for normally overbalancing the same, an inclosed chamber for holding a fluid totally enveloping said weight means for supporting the same, a moving record member, a marking device attached to said steelyard to move therewith, and means for intermittently moving said marking device to engage said record member, said means embodying an electromagnet arranged to deflect said steelyard.

8. An apparatus as characterized comprising a steelyard, weight means for normally overbalancing the same, an inclosed chamber for holding a fluid totally enveloping said weight means for supporting the same, a moving record member, a marking device attached to said steelyard to move therewith, means for intermittently moving said marking device to engage said record member, said means embodying an electromagnet arranged to deflect said steelyard, a prime mover for operating said record member, and means connected with said prime mover for actuating said electromagnet.

9. An apparatus as characterized comprising a steelyard, weight means for normally overbalancing the same, an inclosed chamber for holding a fluid totally enveloping said weight means for supporting the same, a moving record member, a marking device attached to said steelyard to move therewith, and means for intermittently moving said marking device to engage said record member, said means embodying an electromagnet arranged to deflect said steelyard, and an enlarged section on said steelyard for forming an armature for operation upon by said electromagnet, said section remaining in the magnetic field of said electromagnet in all positions of said steelyard.

ZACHARIAS OLSSON.